3,025,214
CHEMICAL COMPOSITION AND PROCESS
Jamal S. Eden, Bath, Ohio, assignor to Diamond Alkali Company, Cleveland, Ohio, a corporation of Delaware
No Drawing. Filed Sept. 9, 1957, Ser. No. 682,628
7 Claims. (Cl. 167—33)

This invention relates to novel substituted 1,3-oxathiolanes, characterized by the following structural formula:

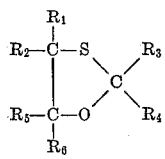

wherein $R_1$, $R_2$, $R_5$, and $R_6$ are selected from the group consisting of hydrogen and alkyl groups having not more than 5 carbon atoms; $R_3$ and $R_4$ are selected from the group consisting of hydrogen, alkyl, aryl and substituted derivatives of the same.

Two specifically preferred compounds of the above type are 2-(3-heptyl)-1,3-oxathiolane and 2-(3-amyl)-1,3-oxathiolane. These compounds exhibit utility in various applications where biological activity is advantageous as in phytocidal compositions, bactericides, defoliants, fungicides, and the like.

Compounds of this invention can be prepared by reacting a carbonyl compound, e.g., an aldehyde or ketone, and a mercapto alcohol, e.g., a beta mercapto alkanol, preferably in the presence of a catalyst such as p-toluene sulfonic acid monohydrate in a process wherein formed water is separated, after which the resultant product is purified. This reaction may be represented as follows:

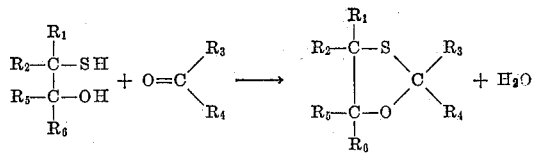

wherein $R_1$, $R_2$, $R_5$, and $R_6$ are selected from the group consisting of hydrogen and alkyl groups, as previously indicated, and $R_3$ and $R_4$ are selected from the group consisting of hydrogen, alkyl, aryl and substituted derivatives of the same.

As noted, compounds of the above type may be employed in a variety of applications, biologically active or otherwise. When employed as biologically active materials, it will be understood, of course, that such compounds may be utilized in diverse formulations, both liquid and solid, including finely-divided powders and granular materials, as well as liquids, e.g., solutions, concentrates, emulsifiable concentrates, slurries, and the like, depending upon the application intended and the formulation media desired.

Thus, it will be appreciated that compounds of this invention may be employed to form biologically active substances containing such compounds as essential active ingredients thereof, which compositions may also include finely-divided dry or liquid diluents, extenders, fillers, conditioners including various clays, diatomaceous earth, talc, spent catalyst, alumina silica materials and liquids, solvents, diluents, etc. as water and various organic liquids such as kerosene, acetone, benzene, toluene, xylene, and other petroleum distillate fractions or mixtures thereof.

When liquid formulations are employed or dry material prepared which are to be used in liquid form, it is desirable in certain instances additionally to employ a wetting, emulsifying or dispersing agent to facilitate use of the formulation, typically, Triton X-155 (alkyl aryl polyether alcohol).

The term "carrier" as employed in the specification and claims is intended to refer broadly to the material constituting a major proportion of a biologically active or other formulation and hence includes finely-divided materials, both liquids and solids, as aforementioned, conventionally used in such applications.

In preparing compounds of the above type, it is generally desirable to effect reaction by refluxing the reactants in an organic medium, typically, benzene, toluene, xylene or other suitable organic liquids.

In order that those skilled in the art may more completely understand the present invention and the preferred method by which the same may be carried into effect, the following specific examples are offered:

EXAMPLE I

Part A

PREPARATION OF 2-(3-HEPTYL)-1,3-OXATHIOLANE

A mixture of 140.8 gm. (1.1 mol.) of 2-ethyl hexaldehyde, 18 gm. (1.0 mol) of beta mercapto-ethanol, and 200 cc. of benzene containing 1.6 gm. p-toluene sulfonic acid monohydrate is refluxed in a round-bottom flask connected to a Dean-Stark water separator for about 3 hours until no more water collects in the separator. The benzene solution is then cooled, washed three times with an aqueous sodium bicarbonate solution, and dried with magnesium sulfate. The benzene is removed by distillation at atmospheric pressure and the product is vacuum-distilled at 90°–93° C. and 2.7–3.2 mm. Hg pressure to give 144 gm. of resultant product, equaling 76.6% yield. This product is insoluble in water, and soluble in acetone and xylene. The following elemental analytical data obtained shows that the desired $C_{10}H_{20}OS$ is obtained:

| Element | Actual percent by weight | Calculated percent by weight |
|---|---|---|
| C | 63.86 | 63.77 |
| H | 10.6 | 10.70 |
| S | 17.4 | 17.02 |

Part B

Tests are conducted to illustrate biological activity by applying the product of Part A to soil, in amounts of 250 mg./4″ clay pot, of test varieties of tomato, corn, and bean plants resulting in the killing of each plant, thus indicating a high degree of herbicidal action.

Part C

Fungus spore germination tests on glass slides are conducted via the test tube dilution method adopted from the procedure recommended by the American Phytopathological Society's committee on standardization of fungicidal tests. In this procedure the product of Part A in aqueous formulations at concentrations of 1000, 100, 10, and 1.0 p.p.m. is tested for its ability to inhibit germination of spores from 7 to 10-day-old cultures of *Alternaria oleraceae* and *Monilinia fructicola*. These concentrations refer to initial concentrations before diluting four volumes with one volume of spore stimulant and spore suspension. Germination records are taken after 20 hours of incubation at 22° C. by counting 100 spores. Copper sulfate is used as the standard reference material. Test compounds are given alphabetical ratings which correspond to the concentration that inhibits germination of half the spores (E.D. 50 value) in the tests: AAA=0.01 to 0.1 p.p.m.; AA=0.1 to 1.0 p.p.m.; A=1.0 to 10 p.p.m.; B=10 to 100 p.p.m.; C=100 to 1000 p.p.m.

Using this procedure the product of Part A receives ratings of B for the *A. oleraceae* and B for the *M. fructicola* showing moderate biological activity as a fungicide.

EXAMPLE II

Part A

PREPARATION OF 2-(3-ANYL)-1,3-OXATHIOLANE

A mixture of 55.0 gm. (0.55 mol) of 2-ethyl butyraldehyde, 39.0 gm. (0.5 mol) of beta mercapto ethanol, and 100 cc. of benzene containing 0.8 gm. of p-toluene sulfonic acid monohydrate is refluxed in a round-bottom flask connected to a Dean-Stark water separator for about 4 hours until no more water collects in the separator. The benzene solution is then cooled and washed three times with an aqueous sodium bicarbonate solution; the benzene is removed by distillation at atmospheric pressure. The product is vacuum-distilled to give a colorless liquid, B.P. 60°–64° C., at 2–3 mm. Hg pressure. The weight of this resultant product is 60 gm., 87% yield. The resulting product is insoluble in water, soluble in acetone and xylene. The following elemental analysis indicates the desired $C_8H_{16}OS$ is obtained:

| Element | Actual percent by weight | Calculated percent by weight |
|---|---|---|
| S | 20.6 | 20.0 |

Part B

Using the procedure given in Part C, Example I, ratings of A for the *A. oleracea* and A for the *M. fructicola* show high biological activity as a fungicide.

Part C

Using the procedure referred to in Part B of Example I the product of Part A of Example II also resulted in the killing of each plant, thus showing high herbicidal effectiveness.

It is to be understood that although the invention has been described with specific reference to particular embodiments thereof, it is not to be so limited since changes and alterations therein may be made which are within the full intended scope of this invention as defined by the appended claims.

What is claimed is:

1. The method of preparing 2-(3-heptyl)-1,3-oxathiolane which comprises reacting 2-ethylhexaldehyde, 2-mercaptoethanol, and benzene containing p-toluene sulfonic acid monohydrate.

2. The method of preparing 2-(3-amyl)-1,3-oxathiolane comprising reacting 2-ethylbutyraldehyde, 2-mercaptoethanol, and benzene containing p-toluene sulfonic acid monohydrate.

3. The method of killing plants and fungi which comprises contacting said plants and fungi with a composition containing as an essential active ingredient a 1,3-oxathiolane of the following formula:

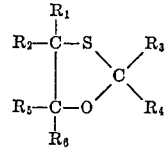

wherein $R_1$, $R_2$, $R_5$ and $R_6$ are selected from the group consisting of hydrogen and alkyl groups having not more than 5 carbon atoms; $R_3$ and $R_4$ are selected from the group consisting of hydrogen, amyl and heptyl radicals, one R being hydrogen.

4. The method according to claim 3 wherein a herbicidal amount of the active ingredient is applied to the soil as a herbicide.

5. The method according to claim 3 wherein the active ingredient is employed in a fungicidal amount as a fungicide.

6. The method according to claim 3 wherein the active ingredient is 2-(3-heptyl)-1,3-oxathiolane.

7. The method according to claim 3 wherein the active ingredient is 2-(3-amyl)-1,3-oxathiolane.

References Cited in the file of this patent

Chem. Abst., vol. 48, col. 11474f to 11478b, 1954 (col. 11476h to 11477e particularly relied on).

King: Chemical Evaluated as Insecticides, U.S. Dept. Agr. Handbook No. 69, pages 4 and 250, items Nos. 7807–8, May 1954.

J.A.C.S., vol. 75, pp. 3704–3708, August 1953.

J.A.C.S., vol. 71, p. 3555, October 1949.